United States Patent
Xiang et al.

(10) Patent No.: US 12,438,687 B2
(45) Date of Patent: *Oct. 7, 2025

(54) RESOURCE CONFIGURATION METHOD, FIRST COMMUNICATIONS DEVICE, SECOND COMMUNICATIONS DEVICE, AND SYSTEM

(71) Applicant: Huawei Technologies Co., Ltd., Shenzhen (CN)

(72) Inventors: Zhengzheng Xiang, Shanghai (CN); Jun Luo, Shanghai (CN); Hongjia Su, Shanghai (CN); Jinfang Zhang, Shenzhen (CN); Lei Lu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,272

(22) Filed: Apr. 29, 2024

(65) Prior Publication Data

US 2024/0356717 A1    Oct. 24, 2024

Related U.S. Application Data

(63) Continuation of application No. 17/012,967, filed on Sep. 4, 2020, now Pat. No. 11,997,051, which is a
(Continued)

(30) Foreign Application Priority Data

Mar. 5, 2018   (CN) .......................... 201810180174.9

(51) Int. Cl.
*H04L 5/00* (2006.01)
*H04W 4/40* (2018.01)
(Continued)

(52) U.S. Cl.
CPC .......... *H04L 5/0098* (2013.01); *H04L 5/0092* (2013.01); *H04W 4/40* (2018.02); *H04W 72/02* (2013.01); *H04W 72/0453* (2013.01)

(58) Field of Classification Search
CPC ...... H04L 5/0098; H04L 5/0092; H04W 4/40; H04W 72/02; H04W 72/0453;
(Continued)

(56) References Cited

U.S. PATENT DOCUMENTS

2016/0234718 A1   8/2016   Thangarasa et al.
2017/0303240 A1   10/2017  Mallick et al.
(Continued)

FOREIGN PATENT DOCUMENTS

CN    104144449 A    11/2014
CN    106717054 A    5/2017
(Continued)

OTHER PUBLICATIONS

3rd Generation Partnership Project, Technical Specification Group Radio Access Network, NR, Physical channels and modulation (Release 15), 3GPP TS 38.211 V15.0.0 (Dec. 2017), 73 pages.
(Continued)

*Primary Examiner* — Yu-Wen Chang
(74) *Attorney, Agent, or Firm* — Slater Matsil, LLP

(57) ABSTRACT

The method includes: determining, by a first communications device, a first BWP for each second communications device in a second communications device group, where the second communications device group includes two or more second communications devices, and the first BWPs of all the second communications devices in the second communications device group are the same; sending, by the first communications device, configuration information of the first BWP to each second communications device in the second communications device group; and sending, by the
(Continued)

first communications device, control signaling to all the second communications devices in the second communications device group, where the control signaling is used to indicate all the second communications devices in the second communications device group to activate the first BWP.

22 Claims, 14 Drawing Sheets

Related U.S. Application Data continuation of application No. PCT/CN2019/076853, filed on Mar. 4, 2019.

(51) Int. Cl.
*H04W 72/02* (2009.01)
*H04W 72/0453* (2023.01)

(58) Field of Classification Search
CPC . H04W 72/121; H04W 72/1289; H04W 4/46; H04W 28/20; H04W 72/04
See application file for complete search history.

(56) References Cited

U.S. PATENT DOCUMENTS

| | | |
|---|---|---|
| 2018/0048435 A1 | 2/2018 | Islam et al. |
| 2018/0049203 A1 | 2/2018 | Xue et al. |
| 2018/0183551 A1 | 6/2018 | Chou et al. |
| 2018/0343089 A1 | 11/2018 | Park |
| 2019/0222290 A1 | 7/2019 | Ly et al. |
| 2019/0261406 A1 | 8/2019 | Kim et al. |
| 2019/0268918 A1 | 8/2019 | Baghel et al. |
| 2020/0059390 A1 | 2/2020 | Zhang et al. |
| 2020/0235887 A1 | 7/2020 | Hou et al. |
| 2020/0288482 A1 | 9/2020 | Yi et al. |
| 2020/0404686 A1 | 12/2020 | Baldemair et al. |
| 2021/0036836 A1 | 2/2021 | Dahlman et al. |
| 2021/0037359 A1 | 2/2021 | Lee et al. |
| 2021/0045122 A1 | 2/2021 | Shi et al. |
| 2021/0051630 A1* | 2/2021 | Chae ............... H04W 72/02 |
| 2021/0068153 A1 | 3/2021 | Seo et al. |

FOREIGN PATENT DOCUMENTS

| | | |
|---|---|---|
| CN | 107211316 A | 9/2017 |
| CN | 107493605 A | 12/2017 |
| CN | 107733622 A | 2/2018 |
| EP | 2991238 A1 | 3/2016 |
| EP | 3254493 A1 | 12/2017 |
| RU | 2507684 C2 | 2/2014 |
| WO | 2016124243 A1 | 8/2016 |

OTHER PUBLICATIONS

3rd Generation Partnership Project, Technical Specification Group Radio Access Network, NR, Physical layer procedures for control (Release 15), 3GPP TS 38.213 V15.0.0 (Dec. 2017), 56 pages.
3rd Generation Partnership Project, Technical Specification Group Radio Access Network, NR, Physical layer procedures for data (Release 15), 3GPP Ts 38.214 V15.0.0 (Dec. 2017), 71 pages.
3rd Generation Partnership Project, Technical Specification Group Radio Access Network, NR, Radio Resource Control (RRC) protocol specification (Release 15), 3GPP TS 38.331 V15.0.0 (Dec. 2017), 188 pages.
Ericsson (Rapporteur), "Summary of BWP linkage for Random Access", 3GPP TSG-RAN WG2 #101, R2-1803871, Athens, Greece, Feb. 26-Mar. 2, 2018, 4 pages.
Huawei et al., "Summary of remaining issues on bandwidth part and wideband operation", 3GPP TSG RAN WG1 Meeting #92, R1-1801347, Athens, Greece, Feb. 26-Mar. 2, 2018, 13 pages.

* cited by examiner

RESOURCE CONFIGURATION METHOD, FIRST COMMUNICATIONS DEVICE, SECOND COMMUNICATIONS DEVICE, AND SYSTEM

CROSS-REFERENCE TO RELATED APPLICATIONS

This application is a continuation of U.S. patent application Ser. No. 17/012,967, filed on Sep. 4, 2020, which is a continuation of International Application No. PCT/CN2019/076853, filed on Mar. 4, 2019, which claims priority to Chinese Patent Application No. 201810180174.9, filed on Mar. 5, 2018. All of the aforementioned patent applications are hereby incorporated by reference in their entireties.

TECHNICAL FIELD

The present application relates to the field of mobile communications, and in particular, to a resource configuration method, a first communications device, a second communications device, and a system.

BACKGROUND

A vehicle-to-everything (V2X) communications system includes a vehicle-to-vehicle (V2V) intelligent transportation service, a vehicle-to-pedestrian (V2P) intelligent transportation service, a vehicle-to-infrastructure (V2I) intelligent transportation service, a vehicle-to-network (V2N) intelligent transportation service, and the like. Vehicles can obtain status information of each other and road conditions in real time by using the vehicle-to-everything (V2X) technology, to better assist vehicle driving or automatic driving. Two communication modes are included in existing LTE V2X communication. In one mode, based on V2X communication scheduled by a network device, a V2X terminal device sends, on a scheduled time-frequency resource based on scheduling information of the network device, a control message and data for V2X communication. In another mode, the V2X terminal device selects, from available time-frequency resources included in a V2X communication resource pool, a time-frequency resource used for communication, and sends a control message and data on the selected resource.

In a next-generation wireless communications system, for example, 5G, a maximum bandwidth of a single carrier below 60 GHz may reach 100 MHz, and a maximum bandwidth of a single carrier above 60 GHz may reach 200 MHz. For terminal devices, maximum bandwidths that can be supported by terminal devices with different capabilities are also different, and not all terminal devices can support a bandwidth of 100 MHz or 200 MHz. To resolve this problem, a bandwidth part (BWP) mechanism is introduced to a 5G system. The BWP is a part of a system bandwidth, and includes several consecutive resource blocks (RB) in the system bandwidth. The network device may configure and activate one or more BWPs for each terminal device. The terminal device and the network device send or receive control data only in an activated BWP, and a maximum of one transport block (TB) is sent on one BWP.

A time-frequency resource for V2X communication is configured based on a V2X communication resource pool. The V2X communication resource pool may be considered as a set of time resources and frequency resources for V2X communication. In a 5G communications system, different V2X terminal devices can support different maximum bandwidths. However, based on different bandwidth capabilities of the V2X terminal devices, how to configure a V2X communication resource based on the BWP mechanism is a technical problem that needs to be resolved.

SUMMARY

This specification describes a resource configuration method and an apparatus. A V2X communication resource is configured based on bandwidth capabilities of different terminal devices and a BWP mechanism, so that V2X terminal devices can communicate with each other.

According to one aspect, a resource configuration method is provided. The method may be performed by a first communications device or a chip of the first communications device. The method includes: configuring, by the first communications device, a first BWP for each second communications device in a second communications device group, where the second communications device group includes a plurality of second communications devices, and the first BWPs of all the second communications devices in the second communications device group are the same; sending, by the first communications device, configuration information of the first BWP to all the second communications devices in the second communications device group; and sending, by the first communications device, control signaling to all the second communications devices in the second communications device group, where the control signaling is used to indicate all the second communications devices in the second communications device group to activate the first BWP.

According to this embodiment of this application, the first communications device configures a same first BWP for all the second communications devices in the second communications device group, so that second communications devices that have different bandwidth capabilities and that are in the second communications device group can communicate with each other via the first BWP.

In a possible design, a bandwidth of the first BWP is less than or equal to a first bandwidth, and the first bandwidth is a maximum bandwidth that can be supported by a second communications device that has a minimum bandwidth capability and that is in the second communications device group. According to this solution, the first BWP may be set based on a minimum bandwidth capability of a user. For example, the second communications device group includes a plurality of second communications devices, and minimum bandwidths of the plurality of second communications devices are 20 MHz. Therefore, the first BWP is set to be less than or equal to 20 MHz, to ensure communication between the second communications device having the minimum bandwidth capability and another second communications device in the second communications device group.

In another possible design, the first communications device may further configure a second BWP for one or more second communications devices in the second communications device group, and send configuration information of the second BWP to the one or more second communications devices in the second communications device group. When some second communications devices in the second communications device group need to perform service communication, the second BWP may be set for some second communications devices in the second communications device group, and the second BWP may be used to ensure communication between some second communications devices. For example, some second communications devices in the second communications device group support communication of a non-basic security service, and the second BWP is configured for some second communications devices, so that the second communications devices perform the communication of the non-basic security service via the second BWP. According to this solution, a communication resource is flexibly configured based on a service requirement of a user, so that V2X terminal devices can communicate with each other.

In another possible design, the first communications device configures the first BWP for each second communications device in the second communications device group in the second BWP. Specifically, the first communications device configures the second BWP for all the second communications devices in the second communications device group, and configures the first BWP for different bandwidth capabilities of the second communications devices in the second BWP. When a second communications device needs to perform service transmission, the second communications device only needs to activate the second BWP, and does not need to deactivate all the first BWPs, thereby reducing a signaling procedure.

In another possible design, the first communications device may further configure one or more V2X communication resource pools on the first BWP, where the configuration information that is of the first BWP and that is sent by the first communications device further includes information about the one or more V2X communication resource pools configured by the first communications device on the first BWP. In this way, finer granularity service communication may be implemented by using the V2X communication resource pool.

In another possible design, the first communications device may further configure one or more V2X communication resource pools on the first BWP, and configure one or more V2X communication resource pools on the second BWP, where the configuration information that is of the first BWP and that is sent by the first communications device further includes information about the one or more V2X communication resource pools configured by the first communications device on the first BWP, and information about the one or more V2X communication resource pools configured by the first communications device on the second BWP.

In another possible design, the first communications device may further configure a first V2X communication resource pool for each second communications device in the second communications device group. The first communications device sends configuration information of the first V2X communication resource pool to each second communications device in the second communications device group. The configuring, by the first communications device, a second BWP for one or more second communications devices in the second communications device group includes: configuring, by the first communications device, the second BWP for the one or more second communications devices in the second communications device group within the first V2X communication resource pool.

According to another aspect, a resource configuration method is provided in an embodiment of the present application. The method may be performed by a second communications device or a chip of the second communications device. The method includes: receiving, by the second communications device, configuration information that is of a first bandwidth part BWP and that is sent by a first communications device, where the second communications device is a second communications device in a second communications device group, and the first BWPs of all the second communications devices in the second communications device group are the same; receiving, by the second communications device, control signaling sent by the first communications device; and activating, by the second communications device, the first BWP based on the control signaling.

A bandwidth of the first BWP is less than or equal to a first bandwidth, and the first bandwidth is a maximum bandwidth that can be supported by a second communications device that has a minimum bandwidth capability and that is in the second communications device group.

In a possible design, the second communications device further receives configuration information of a second BWP, where the configuration information of the second BWP is configured by the first communications device for one or more second communications devices in the second communications device group.

In another possible design, the receiving, by a second communications device, configuration information that is of a first BWP and that is sent by a first communications device includes: receiving, by the second communications device, the configuration information that is of the first BWP and that is sent by the first communications device, where the configuration information of the first BWP includes information about the first BWP configured by the first communications device for each second communications device in the second communications device group in the second BWP.

In another possible design, the configuration information of the first BWP further includes information about one or more V2X communication resource pools configured by the first communications device on the first BWP.

In another possible design, the configuration information of the first BWP further includes information about one or more V2X communication resource pools configured by the first communications device on the first BWP, and information about one or more V2X communication resource pools configured by the first communications device on the second BWP.

In another possible design, the method further includes: receiving, by the second communications device, configuration information that is of a first V2X communication resource pool and that is sent by the first communications device to each second communications device in the second communications device group, where the configuration information of the first BWP further includes information about the first BWP configured by the first communications device for each second communications device in the second communications device group within the first V2X communication resource pool, and the configuration information of the second BWP further includes information about the second BWP configured by the first communications device for one or more second communications devices in the second communications device group within the first V2X communication resource pool.

According to another aspect, a first communications device is provided. The first communications device may alternatively be a chip in the first communications device. The first communications device includes: a processing module, configured to configure a first BWP for each second communications device in a second communications device group, where the second communications device group includes a plurality of second communications devices, and the first BWPs of all the second communications devices in the second communications device group are the same; and a sending module, configured to send configuration information of the first BWP configured by the processing module, to all the second communications devices in the second communications device group; and the sending module is configured to send control signaling to all the second communications devices in the second communications device group, where the control signaling is used to indicate all the second communications devices in the second communications device group to activate the first BWP configured by the processing module.

A bandwidth of the first BWP is less than or equal to a first bandwidth, and the first bandwidth is a maximum bandwidth that can be supported by a second communications device that has a minimum bandwidth capability and that is in the second communications device group.

In a possible design, the processing module is further configured to configure a second BWP for one or more second communications devices in the second communications device group; and the sending module is further configured to send configuration information of the second BWP configured by the processing module, to the one or more second communications devices in the second communications device group.

In another possible design, the processing module is specifically configured to configure the first BWP configured for each second communications device in the second communications device group in the second BWP.

In another possible design, the processing module is configured to configure one or more V2X communication resource pools on the first BWP, where the configuration information that is of the first BWP and that is sent by the sending module to each second communications device in the second communications device group further includes information about the one or more V2X communication resource pools configured on the first BWP.

In another possible design, the processing module is configured to configure one or more V2X communication resource pools on the first BWP, and configure one or more V2X communication resource pools on the second BWP, where the configuration information that is of the first BWP and that is sent by the sending module further includes information about the one or more V2X communication resource pools configured on the first BWP, and information about the one or more V2X communication resource pools configured on the second BWP.

In another possible design, the processing module is further configured to configure a first V2X communication resource pool for each second communications device in the second communications device group. The sending module is further configured to send configuration information of the first V2X resource pool to each second communications device in the second communications device group. The processing module is specifically configured to configure a second BWP for one or more second communications devices in the second communications device group within the first V2X communication resource pool.

According to another aspect, a second communications device is provided. The second communications device may alternatively be a chip in the second communications device. The second communications device includes: a receiving module, configured to receive configuration information of a first bandwidth part BWP, where the second communications device is a second communications device in a second communications device group, and the first BWPs of all the second communications devices in the second communications device group are the same; and the receiving module is configured to receive control signaling sent by the first communications device; and a processing module, configured to: after the receiving module receives the control signaling, activate the first BWP indicated by the configuration information of the first BWP.

In a possible design, a bandwidth of the first BWP is less than or equal to a first bandwidth, and the first bandwidth is a maximum bandwidth that can be supported by a second communications device that has a minimum bandwidth capability and that is in the second communications device group.

In another possible design, the receiving module is further configured to receive configuration information that is of a second BWP and that is sent by the first communications device, where the configuration information of the second BWP is configured by the first communications device for the second communications device.

In another possible design, the receiving module is specifically configured to receive the configuration information that is of the first BWP and that is sent by the first communications device, where the configuration information of the first BWP includes information about the first BWP configured for each second communications device in the second communications device group in the second BWP.

In another possible design, the configuration information that is of the first BWP and that is received by the receiving module further includes information about one or more V2X communication resource pools configured by the first communications device on the first BWP.

In another possible design, the configuration information that is of the first BWP and that is received by the receiving module further includes information about one or more V2X communication resource pools configured by the first communications device on the first BWP, and information about one or more V2X communication resource pools configured by the first communications device on the second BWP.

In another possible design, the receiving module is further configured to receive configuration information that is of a first V2X communication resource pool and that is sent by the first communications device to each second communications device in the second communications device group, where the configuration information of the first BWP further includes information about the first BWP configured by the first communications device for each second communications device in the second communications device group within the first V2X communication resource pool, and the configuration information of the second BWP further includes information about the second BWP configured by the first communications device for one or more second communications devices in the second communications device group within the first V2X communication resource pool.

According to still another aspect, an embodiment of the present application provides a communications system. The system includes at least two second communications devices in the second communications device group and the first communications device according to the foregoing aspects.

According to still another aspect, an embodiment of the present application provides a computer storage medium, configured to store a computer software instruction used by the foregoing first communications device. The computer storage medium includes a program used for executing the foregoing aspects.

According to still another aspect, an embodiment of the present application provides a computer storage medium, configured to store a computer software instruction used by the foregoing second communications device. The computer storage medium includes a program used for executing the foregoing aspects.

BRIEF DESCRIPTION OF THE DRAWINGS

FIG. 5a-1 and FIG. 5a-2 are schematic structural diagrams showing another resource configuration according to an embodiment of the present application;

DETAILED DESCRIPTION OF ILLUSTRATIVE EMBODIMENTS

The technical solutions of this application may be applied to a 3rd generation (3G) communications network, a 4th generation (4G) communications network, a 5th generation (5G) communications network, and a subsequent evolved network.

Figure 1:
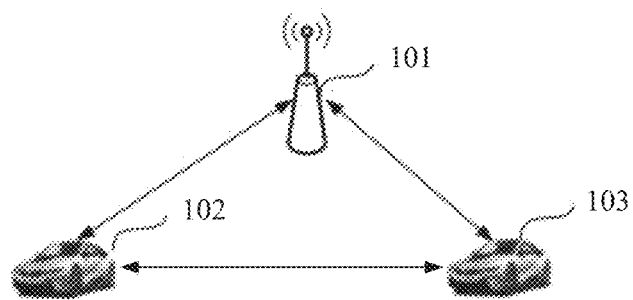
FIG. 1 is a schematic diagram of a network architecture of a communications network according to an embodiment of the present application.

FIG. 1 is a schematic diagram of a possible architecture of a V2X communications system according to an embodiment of the present application. As shown in FIG. 1, an architecture of the V2X communications system includes V2V communication and vehicle-to-network (V2N) communication. The communications system includes a first communications device 101 and a second communications device group 1. The second communications device group 1 includes a second communications device 102 and a second communications device 103. The V2V communication includes communication between the second communications device 102 and the second communications device 103. The V2N communication includes communication between the first communications device and the second communications device 102 or the second communications device 103.

In this application, an example in which a quantity of "second communications devices included in the second communications device group" is 2 or 3 is used for description. The second communications device group in the embodiments of the present application may also include more second communications devices. This is not specifically limited in the present application.

There may be one or more "first BWPs" in this application. For ease of description, the present application uses one or two BWPs as an example for description. However, a quantity of first BWPs included in the present application is not limited thereto.

There may be one or more "second BWPs" in this application. For ease of description, the present application uses one or two BWPs as an example for description. However, a quantity of second BWPs included in the present application is not limited thereto.

"A plurality of" in the expression "one or more" in this application indicates two or more.

In FIG. 1, the first communications device 101 configures first BWPs for the second communications device 102 and the second communications device 103 that are in the second communications device group 1, where the first BWP of the second communications device 102 is the same as the first BWP of the second communications device 103. The first communications device 101 sends configuration information of the first BWPs to the second communications device 102 and the second communications device 103 that are in the second communications device group 1. The first communications device 101 sends control signaling to the second communications device 102 and the second communications device 103 that are in the second communications device group, where the control signaling is used to indicate the second communications device 102 and the second communications device 103 that are in the second communications device group to activate the first BWPs.

The first communications device in this application is an apparatus that is deployed in a radio access network and that is configured to provide a wireless communication function for a second communications device. The first communications device may include network devices or base stations (BS) in various forms, for example, a macro base station, a micro base station, a relay node, or an access point. In systems using different radio access technologies, names of the network devices may be different. For example, the network device is a network device or a base station in a 5th generation 5G network. In a long term evolution (LTE) network, the network device is referred to as an evolved NodeB (eNB or eNodeB). In a third generation 3G network, the network device is referred to as a node B or the like, a road side unit (RSU) in V2V communication, or a chip or a system on chip (SOC) in the network device or base station. For ease of description, in this application, the apparatuses that provide the wireless communication function for the second communications device is collectively referred to as the first communications device.

The second communications device in this application may be a terminal device, for example, may include various devices having a wireless communication function, or a chip or an SOC in the device. The device having a wireless communication function may be, for example, a vehicle-mounted device, a wearable device, a computing device, or another processing device connected to a wireless modem, a mobile station (MS), a terminal, and user equipment (UE). For ease of description, in this application, the devices mentioned above are collectively referred to as the second communications device.

Figure 2:
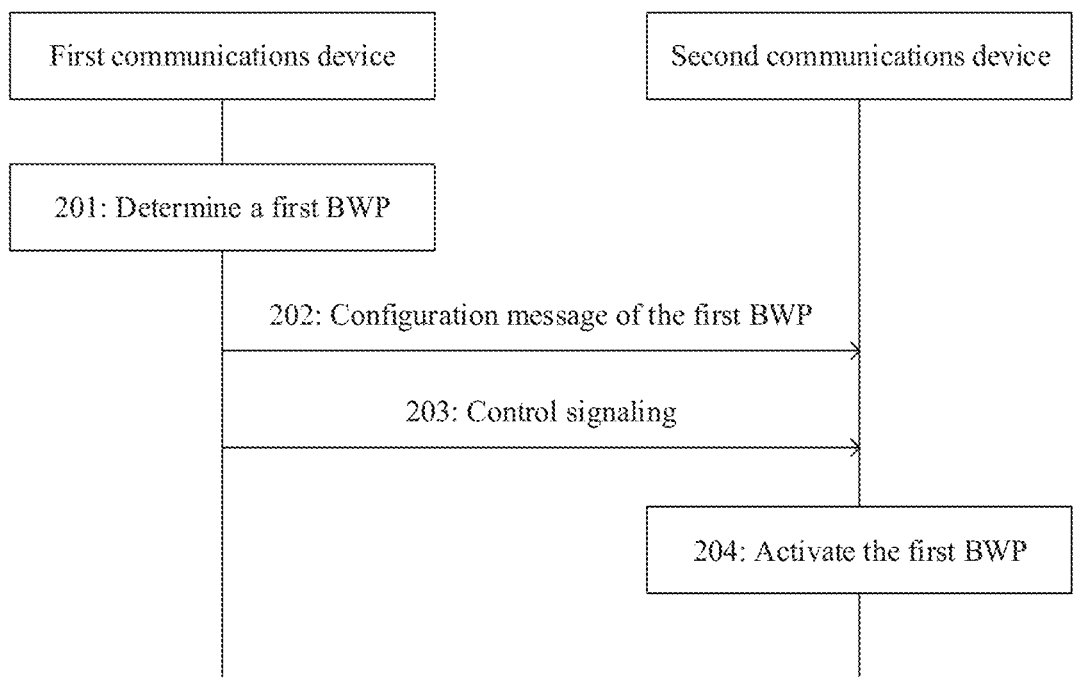
FIG. 2 is a schematic flowchart of a resource configuration method according to an embodiment of the present application.
Figure 8:
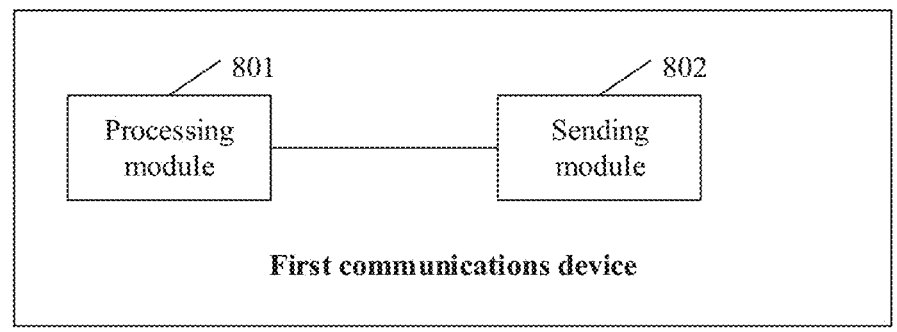
FIG. 8 is a schematic structural diagram of a first communications device according to an embodiment of this application.
Figure 9:
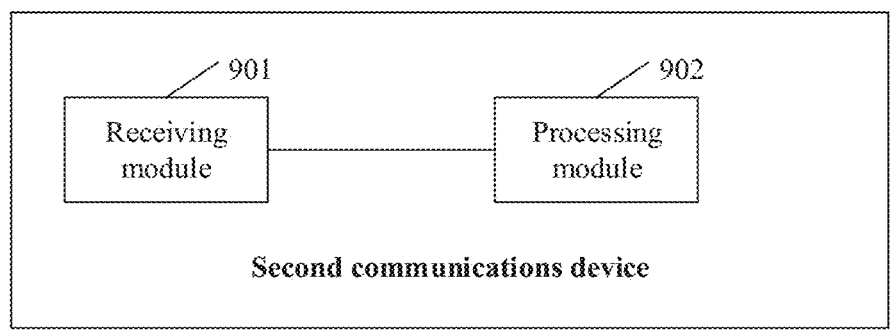
FIG. 9 is a schematic structural diagram of a second communications device according to an embodiment of this application.

FIG. 2 shows a resource configuration method, a first communications device, and a second communications device according to an embodiment of this application. As shown in FIG. 8, the first communications device includes a processing module 801 and a sending module 802. As shown in FIG. 9, the second communications device may include a receiving module 901 and a processing module 902.

Figure 10:
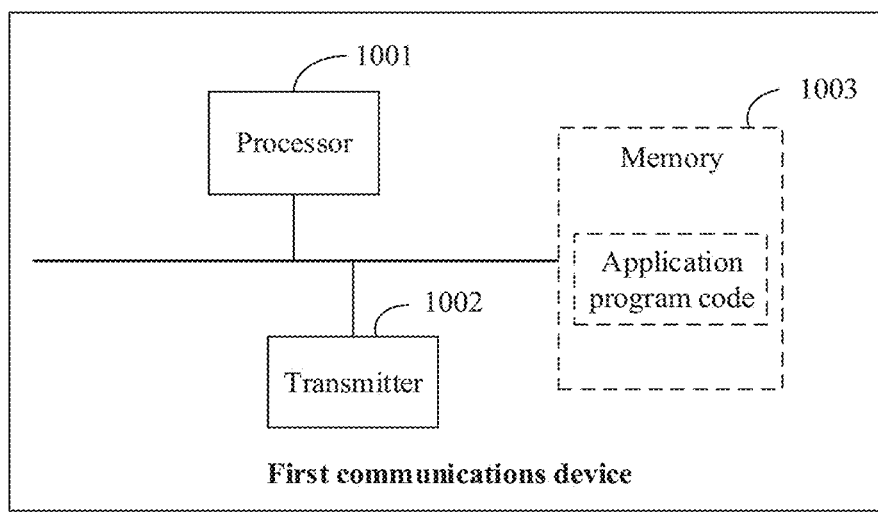
FIG. 10 is a schematic structural diagram of another first communications device according to an embodiment of this application.
Figure 11:
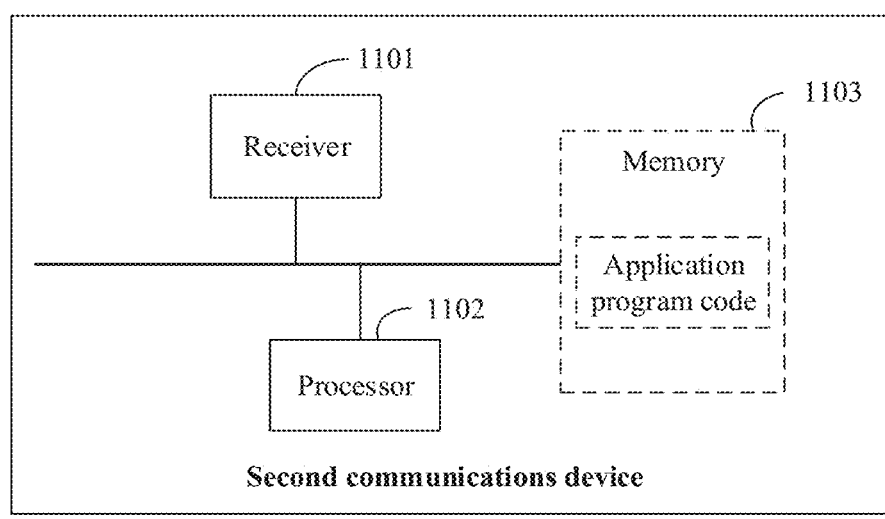
FIG. 11 is a schematic structural diagram of another second communications device according to an embodiment of this application.

When the first communications device is a network device or a base station, and the second communications device is a terminal device or a wireless device, as shown in FIG. 10 and FIG. 11, the processing module 801 and the processing module 902 may be processors, the sending module 802 is a transmitter, and the receiving module 901 is a receiver. When the first communications device includes a memory 1003 or the second communications device includes a memory 1103, the memories are configured to store a computer instruction, the processor is connected to the memory, and the processor executes the stored computer instruction, so that the first communications device and the second communications device perform the method in the embodiment in FIG. 2. The processor may be a central processing unit (CPU), a microprocessor, or an application-specific integrated circuit (ASIC).

When the first communications device or the second communications device is a chip, the processing module 801 or the processing module 902 may be, for example, the processor, the receiving module 901 may be an input interface, a pin, a circuit, or the like, and the sending module 802 may be an output interface, a pin, a circuit, or the like. The processing module may execute a computer execution instruction stored in a storage module, so that a chip in the first communications device or the second communications device performs the method in FIG. 2. Optionally, the storage module is a storage module in the chip, such as a register or a buffer, or the storage module may be a storage module in a terminal but outside the chip, such as a read-only memory (ROM), another type of static storage device that can store static information and a static instruction, or a random access memory (RAM).

It should be specially noted that in actual application, both the first communications device and the second communications device may include one or more processors, and a structure of the first communications device does not constitute a limitation on this embodiment of this application.

For example, the processor may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

For another example, the memory of the first communications device or the second communications device may include a volatile memory, for example, a random access memory (RAM). The memory 903 may also include a non-volatile memory, for example, a read-only memory (ROM), a flash memory, a hard disk drive (HDD), or a solid-state drive (SSD). The memory 903 may also include a combination of the foregoing types of memories.

Specific steps of the resource configuration method in the embodiment shown in FIG. 2 are as follows.

Step 201: The first communications device configures a first BWP for each second communications device in a second communications device group, where the second communications device group includes two or more second communications devices, and the first BWPs of all the second communications devices in the second communications device group are the same.

That the first BWPs of all the second communications devices are the same means that the first BWPs of all the second communications devices occupy a same RB in frequency domain.

Figure 2A:
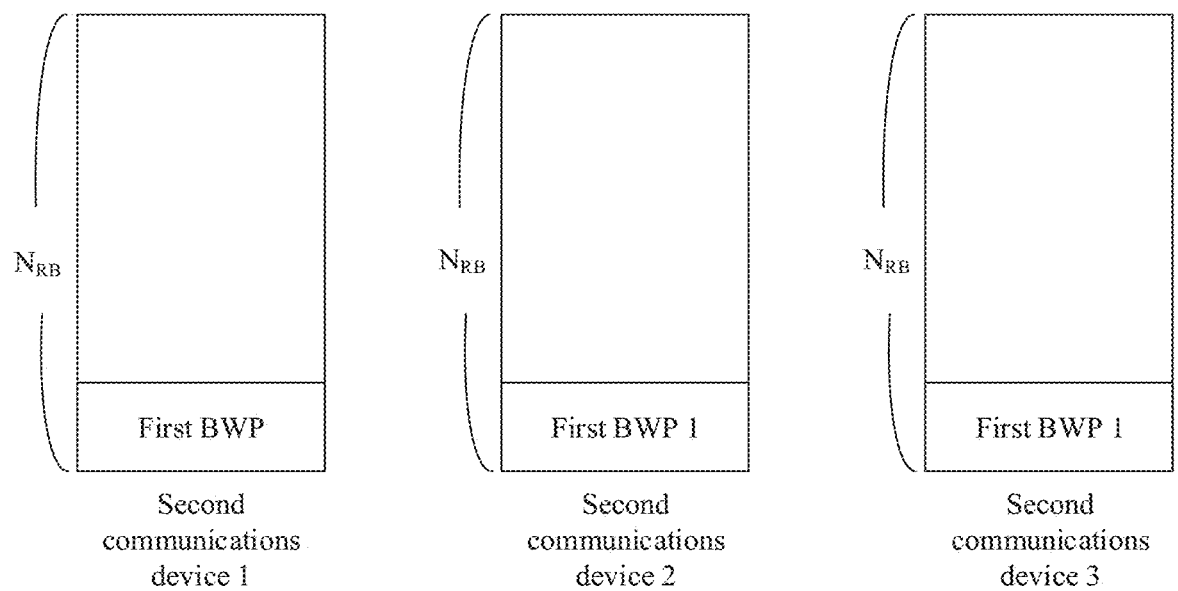
FIG. 2a is a schematic structural diagram showing a resource configuration according to an embodiment of the present application.

For example, the second communications device group includes three second communications devices, and a configuration of the first BWP of each second communications device in a system bandwidth of 100 MHz is shown in FIG. 2a. If sequence numbers of 273 RBs included in the system bandwidth of 100 MHz are 0, 1, . . . , and 272 (it is assumed that a subcarrier spacing is 30 kHz), first BWPs of all the second communications devices are the same, that is, RBs occupied by the first BWP of each second communications device are an RB-0 to an RB-50.

For example, a bandwidth of the first BWP is less than or equal to a first bandwidth, and the first bandwidth is a maximum bandwidth that can be supported by a second communications device that has a minimum bandwidth capability and that is in the second communications device group. According to this solution, the second communications device having the minimum bandwidth capability can communicate with another second communications device in the second communications device group.

For example, a second communications device group 1 includes a second communications device 1, a second communications device 2, and a second communications device 3. If a bandwidth of the second communications device 1 is 20 MHZ, a bandwidth of the second communications device 2 is 30 MHz, and a bandwidth of the second communications device 3 is 50 MHz, the bandwidth of the first BWP is less than or equal to 20 MHz, namely, a maximum bandwidth that can be supported by the second communications device 1 in the second communications device group.

For example, the first BWP may be one BWP, or may be a plurality of BWPs, and "a plurality of" indicates two or more. To understand the technical solutions of the present application, this embodiment of the present application is described by using one or two first BWPs as an example. Details are not described herein.

Figure 3:
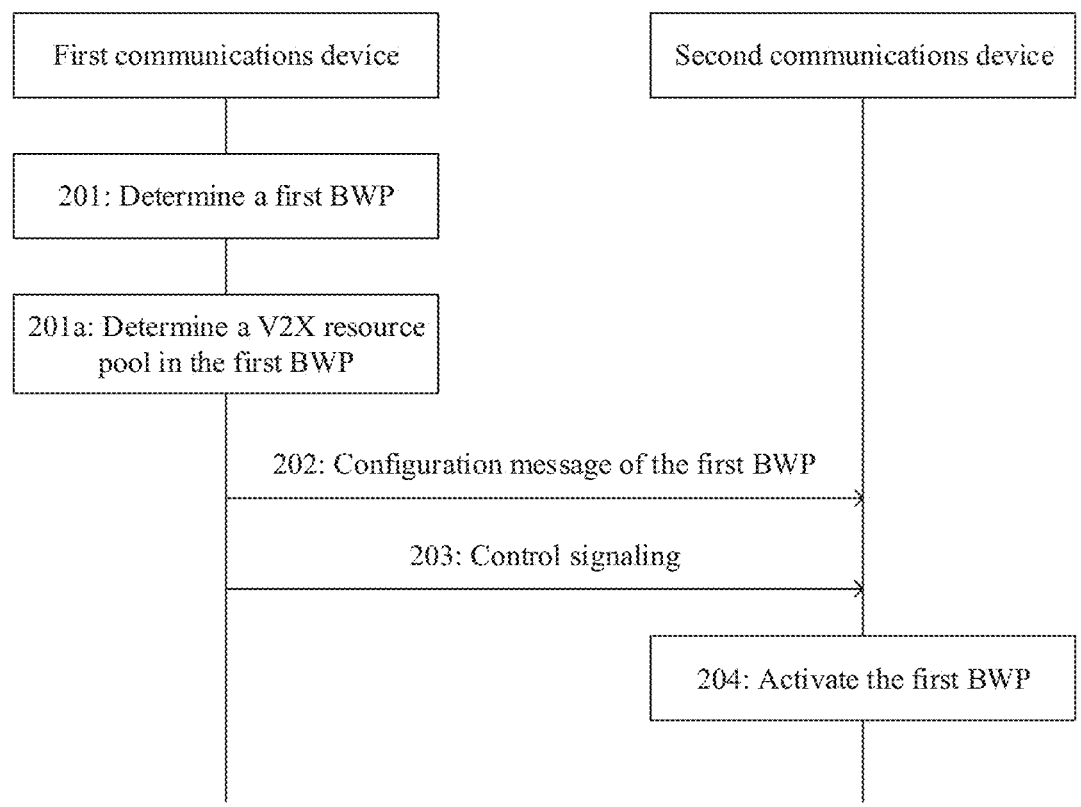
FIG. 3 is a schematic flowchart of another resource configuration method according to an embodiment of the present application.

For example, as shown in FIG. 3, this embodiment is similar to the embodiment shown in FIG. 2, and a difference lies in that the method further includes step 201a: The first communications device configures one or more V2X communication resource pools (for ease of description, briefly referred to as resource pools below) on the first BWP.

Figure 3A:
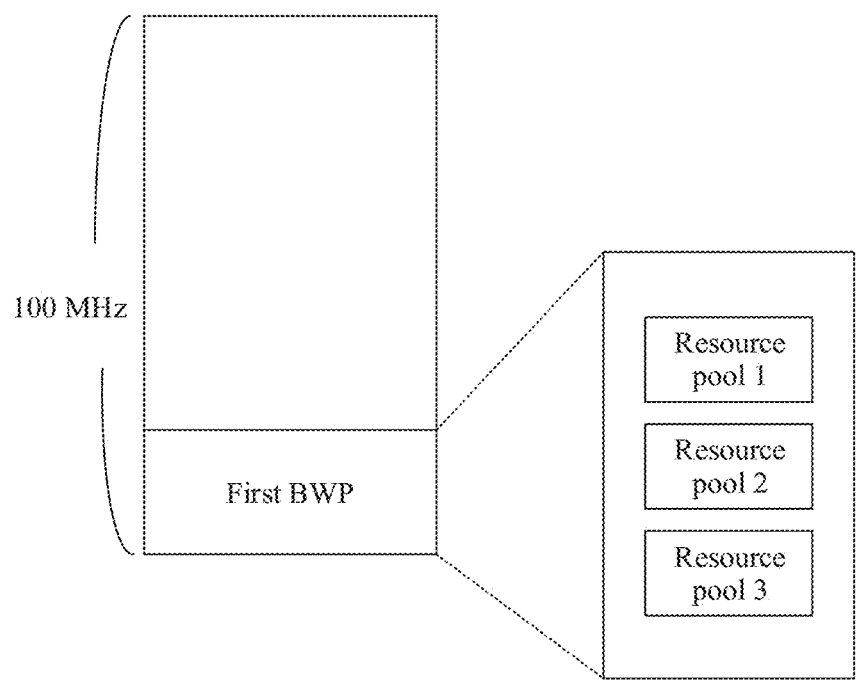
FIG. 3a and FIG. 3b are schematic structural diagrams showing a resource configuration according to an embodiment of the present application.
Figure 3B:
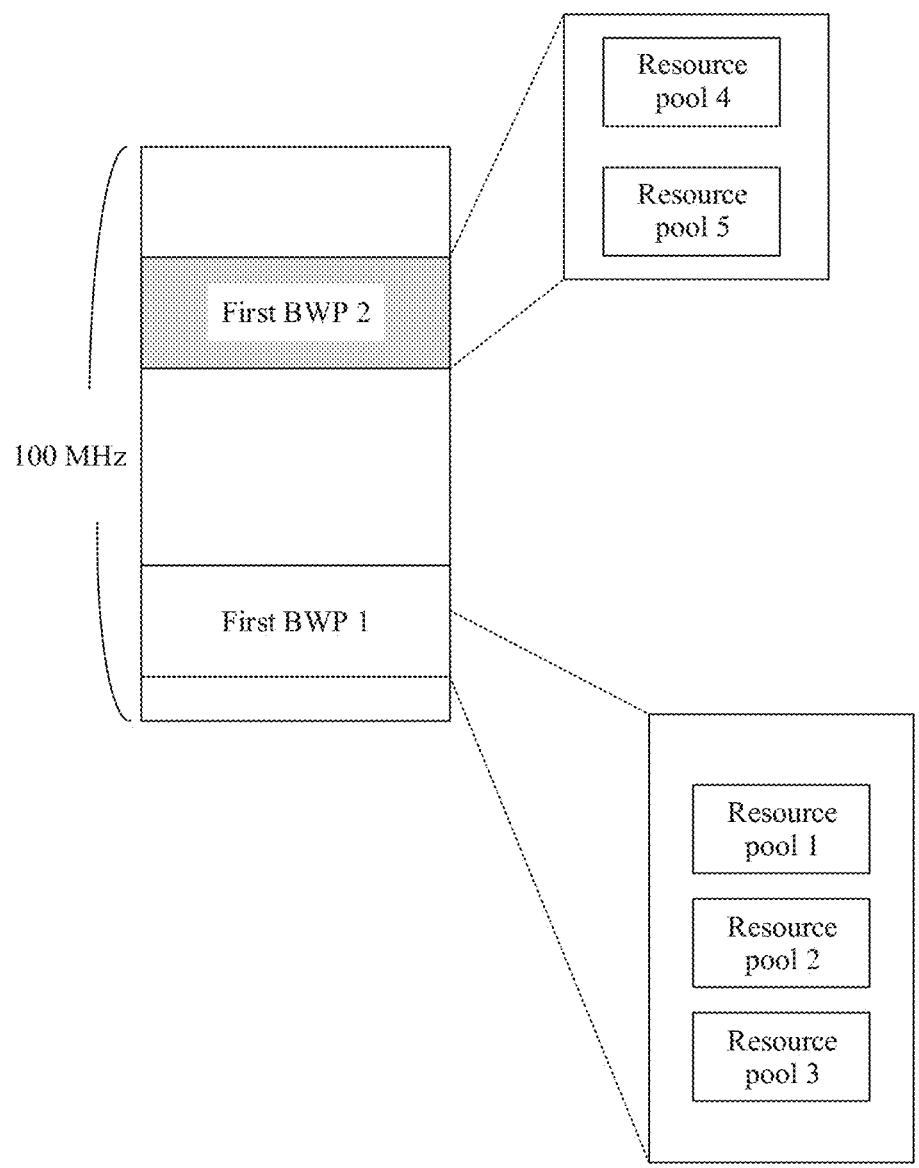

For example, as shown in FIG. 3a, a bandwidth of 100 MHz is used as an example. The first communications device configures three resource pools on the first BWP: a resource pool 1, a resource pool 2, and a resource pool 3. For another example, as shown in FIG. 3b, the first communications device configures two first BWPs: a first BWP 1 and a first BWP 2, for each second communications device in the second device group. The first communications device configures a resource pool 1, a resource pool 2, and a resource pool 3 on the first BWP 1, and configures a resource pool 4 and a resource pool 5 on the first BWP 2.

In this embodiment of the present application, the first communications device may configure one or more first BWPs, and each first BWP may correspond to one or more resource pools.

The first BWP may be used to transmit a first service between all second communications devices in the second communications device group. For example, information about a basic security service may be transmitted between all the second communications devices in the second communications device group. Specifically, the second communications device may send the information about the basic security service in at least one resource pool on the first BWP, and receive, in all resource pools on the first BWP, information that is about the basic security service and that is sent by another second communications device in the second communications device group.

Figure 4:
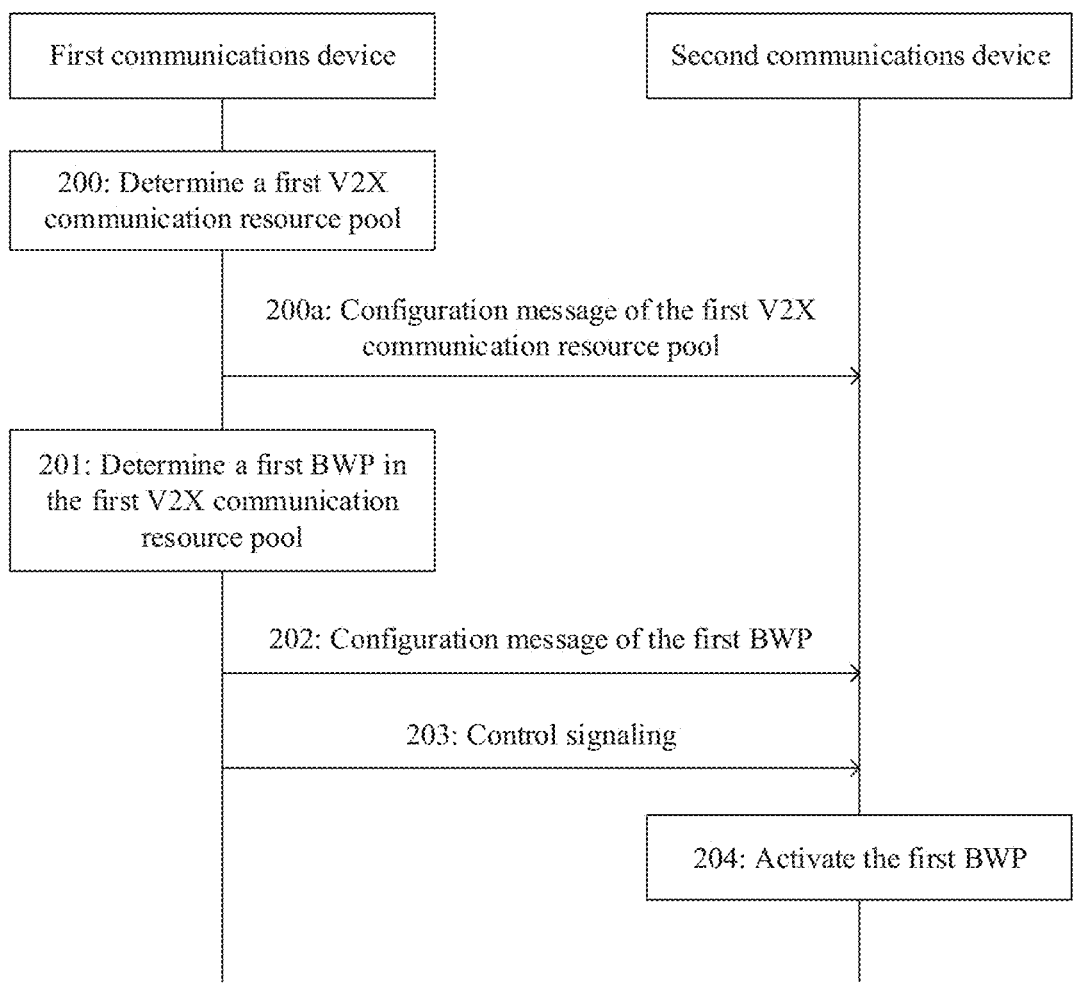
FIG. 4 is a schematic flowchart of another resource configuration method according to an embodiment of the present application.

For example, as shown in FIG. 4, the embodiment shown in FIG. 2 may further include the following steps.

Step 200: The first communications device configures a first V2X communication resource pool for each second communications device in the second communications device group.

Step 200*a*: The first communications device sends configuration information of the first V2X communication resource pool to each second communications device in the second communications device group, and the second communications device receives the configuration information of the first V2X communication resource pool.

Optionally, step 200*a* may also be combined with step 202. To be specific, the configuration information of the first V2X communication resource pool may be included in the configuration information of the first BWP.

It should be specially noted that a plurality of V2X resource pools on a same BWP may be frequency division multiplexed or time division multiplexed.

Step 202: The first communications device sends the configuration information of the first BWP to each second communications device in the second communications device group, and the second communications device receives the configuration information that is of the first BWP and that is sent by the first communications device.

The configuration information of the first BWP may be included in a radio resource control (RRC) message. For example, the configuration information of the first BWP may be configuration information of a bandwidth part.

Step 203: The first communications device sends control signaling to all the second communications devices in the second communications device group, and the second communications device receives the control signaling sent by the first communications device.

For example, the control signaling may be activation signaling, and is used to activate the first BWP. A name of the signaling is not specifically limited in this embodiment of the present application, and a sending form is not specifically limited. For example, the signaling may be carried in a message for sending, or one piece of signaling may be separately sent. Any form shall within the protection scope of this embodiment of the present application provided that the objective of activating the first BWP can be achieved.

The control signaling includes activation indication information of the bandwidth part, and is used to indicate a BWP specifically activated by the second communications device. For example, when the first communications device configures a plurality of first BWPs: a first BWP 1, a first BWP 2, and a first BWP 3, the activation indication information that is of the bandwidth part and that is included in the control signaling is used to indicate to activate the first BWP 1, the first BWP 2, and/or the first BWP 3.

Step 204: The second communications device activates the first BWP after receiving the control signaling.

That the second communications device activates the first BWP means that the second communications device sends or receives information, for example, the information about the basic security service, on the first BWP.

According to this embodiment of this application, the first communications device configures a same first BWP for all the second communications devices in the second communications device group, so that second communications devices that have different bandwidth capabilities and that are in the second communications device group can communicate with each other via the first BWP.

It should be specially noted that in the foregoing embodiments, the first BWP may be configured by the processing module 801 of the first communications device, and the sending module 802 of the first communications device sends the configuration information of the first BWP to the second communications device. The receiving module 901 of the second communications device receives the configuration information that is of the first BWP and that is sent by the sending module 802 of the first communications device, and receives the control signaling sent by the sending module 802 of the first communications device, and then the processing module 902 of the second communications device activates the first BWP.

Further, in the foregoing embodiments, the processing module 801 of the first communications device is further configured to configure one or more V2X communication resource pools on the first BWP.

Further, in the foregoing embodiments, the processing module 801 of the first communications device configures the first V2X communication resource pool for each second communications device in the second communications device group. The sending module 802 of the first communications device sends the configuration information of the first V2X communication resource pool to each second communications device in the second communications device group. The receiving module 901 of the second communications device receives the configuration information of the first V2X communication resource pool.

Figure 5:
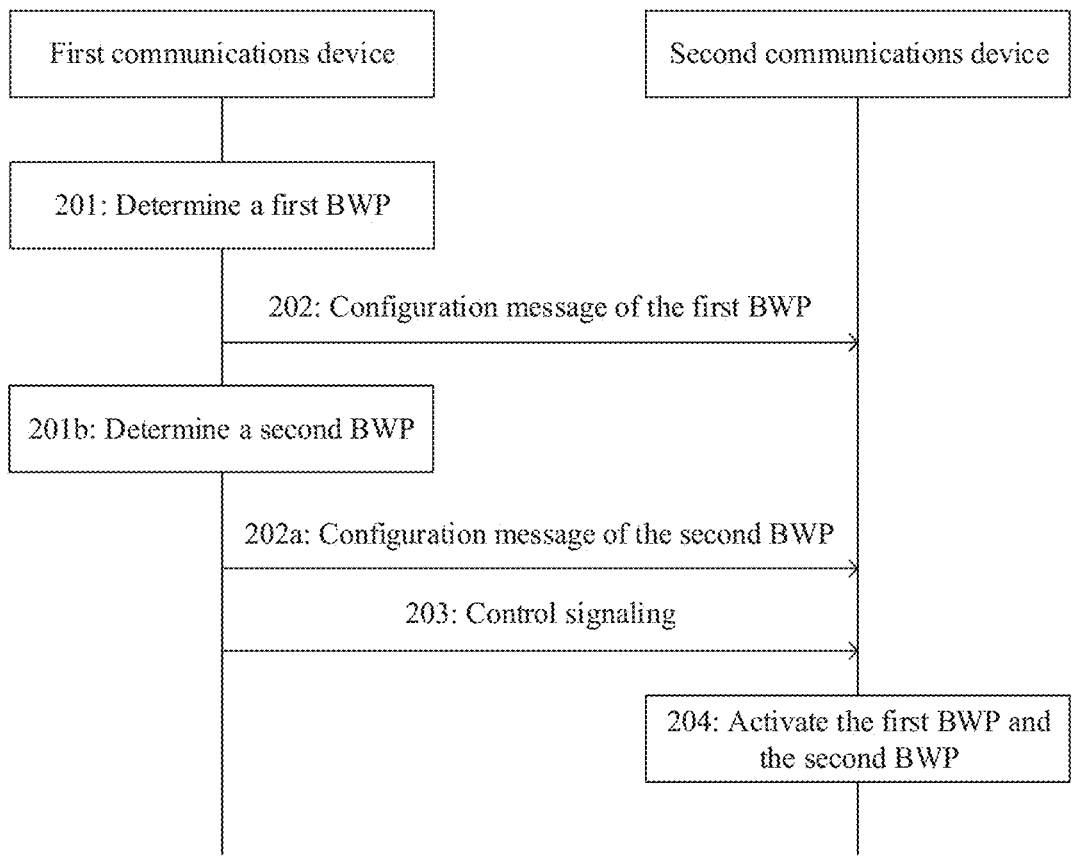
FIG. 5 is a schematic flowchart of another resource configuration method according to an embodiment of the present application.
Figures 1, 5A:
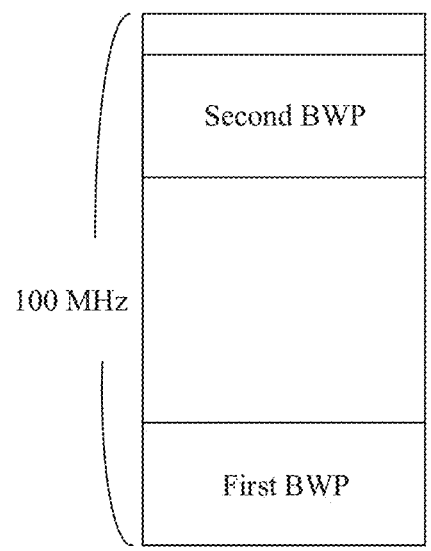
Figures 2, 5A:
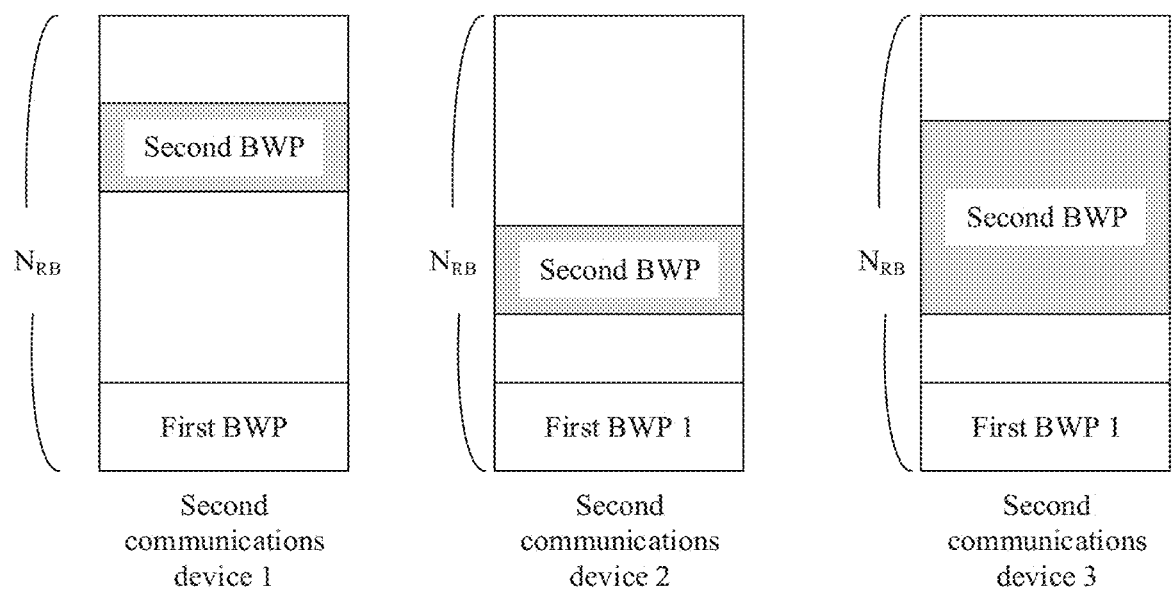

In a possible design, as shown in FIG. 5, the first communications device may further configure the second BWP for one or more second communications devices in the second communications device group. For example, as shown in FIG. 5*a*-1, a bandwidth of 100 MHz is used as an example for description, and a first BWP and a second BWP are configured for one second communications device in the bandwidth of 100 MHz. FIG. 5*a*-2 is a schematic structural diagram in which a second BWP is configured for a plurality of second communications devices. In the figure, three second communications devices are used as an example. Sequence numbers of 273 RBs included in a system bandwidth of 100 MHz are 0, 1, . . . , and 272 (it is assumed that a subcarrier spacing is 30 kHz). First BWPs of all the second communications devices are the same. For example, occupied RBs are an RB-0 to an RB-50, and second BWPs of the second communications devices may be different. For example, RBs occupied by a second BWP of a second communications device 1 are an RB-160 to an RB-200, RBs occupied by a second BWP of a second communications device 2 are an RB-100 to an RB 150, and RBs occupied by a second BWP of a second communications device 3 are an RB-100 to an RB-200. For another example, the second BWP may also be configured for two second communications devices in the second communications device group.

For a service that does not need to be supported by all the second communications devices in the second communications device group, the second BWP configured for some second communications device group may be used for communication. For example, some second communications devices in the second communications device group support communication of a non-basic security service, and the second BWP is configured for some second communications devices, so that the second communications devices perform communication of the non-basic security service via the second BWP.

Optionally, the method may further include step 202a: The first communications device sends configuration information of the second BWP to one or more second communications devices in the second communications device group, and the second communications device receives the configuration information of the second BWP. It should be specially noted that the configuration information of the second BWP may also be included in the configuration information of the first BWP, and the second communications device does not need to be notified of the configuration information of the second BWP through additional signaling.

The second BWP may be configured by the processing module 801 of the first communications device. The sending module 802 of the first communications device sends the configuration information of the second BWP, and the receiving module 901 of the second communications device receives the configuration information of the second BWP.

FIG. 5 is described by using an example in which the second BWP is configured after the first communications device configures the first BWP. In this embodiment of the present application, the second BWP may also be configured before the first BWP is configured. A sequence of configuring the first BWP and the second BWP is not specifically limited in this embodiment of the present application.

Figure 5B:
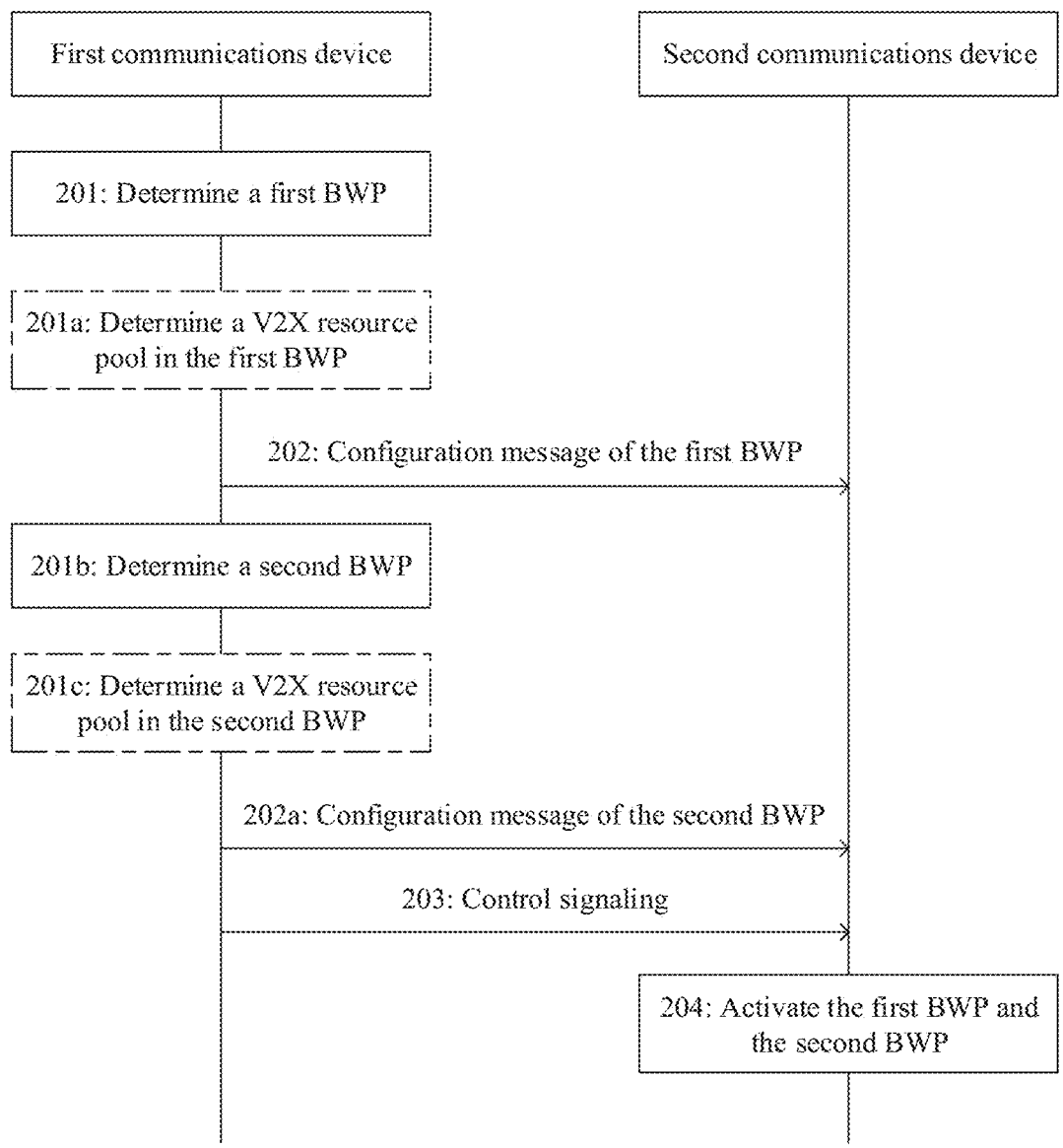
FIG. 5b is a schematic flowchart of another resource configuration method according to an embodiment of the present application.
Figure 5C:
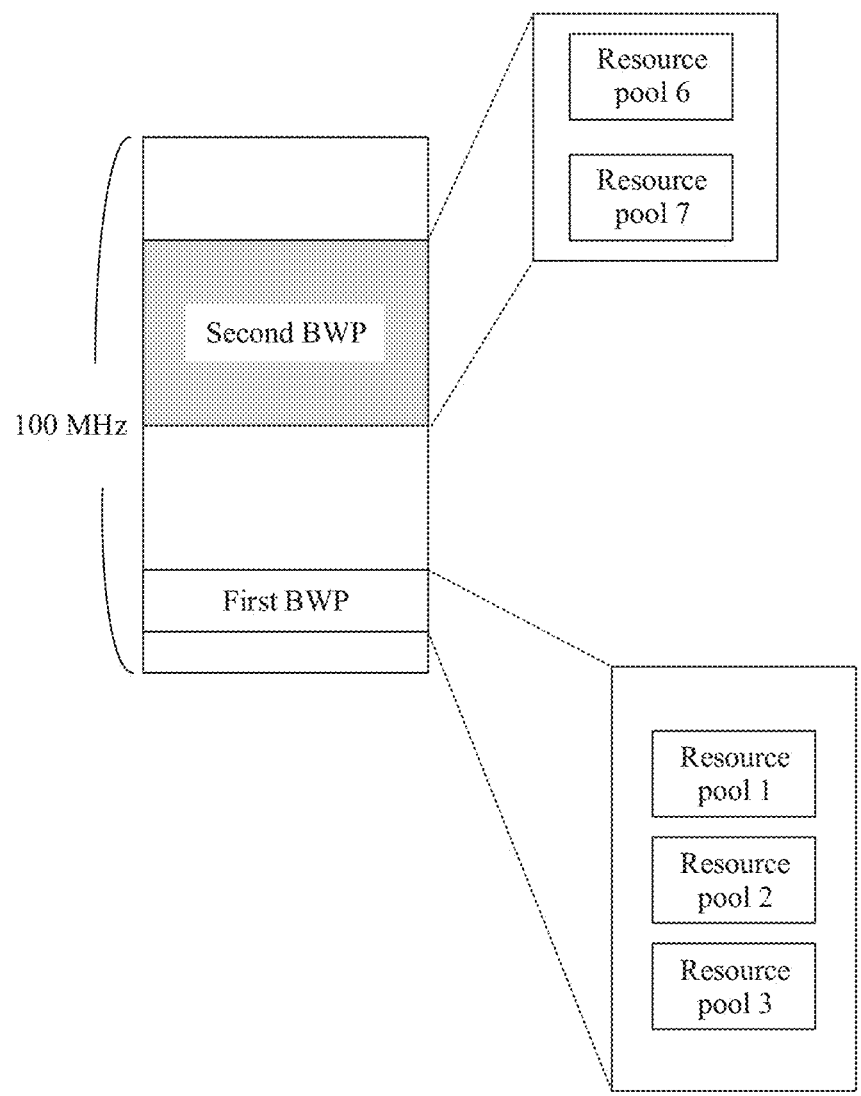
FIG. 5c is a schematic structural diagram showing another resource configuration according to an embodiment of the present application.

For another example, as shown in FIG. 5b, based on the embodiment shown in FIG. 3, this embodiment may further include step 201c: The first communications device configures one or more V2X communication resource pools on the second BWP. Specifically, as shown in FIG. 5c, the first communications device configures two resource pools on the second BWP: a resource pool 6 and a resource pool 7.

Further, the processing module 801 of the first communications device may configure one or more V2X communication resource pools.

Figure 6:
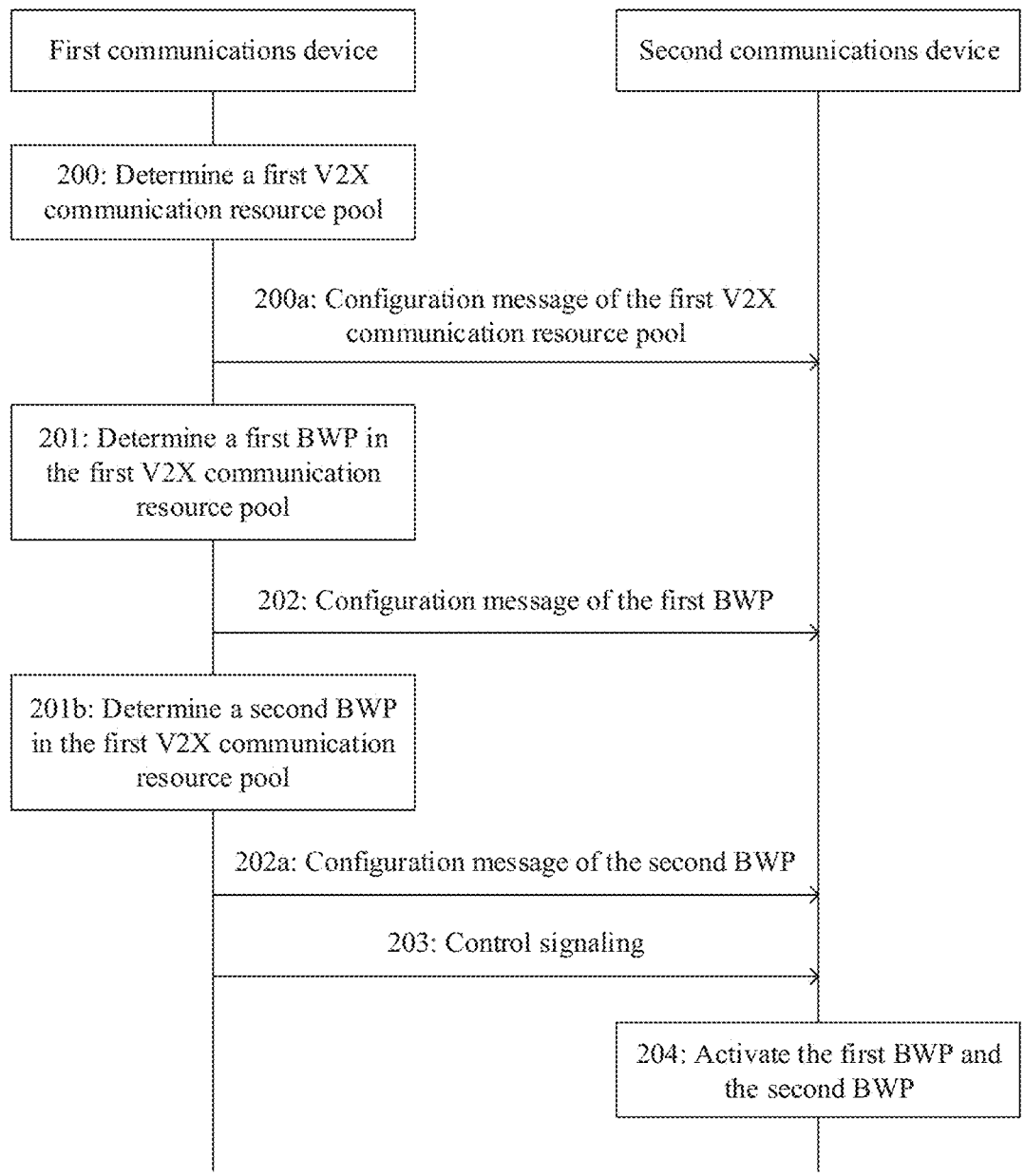
FIG. 6 is a schematic flowchart of another resource configuration method according to an embodiment of the present application.
Figure 6A:
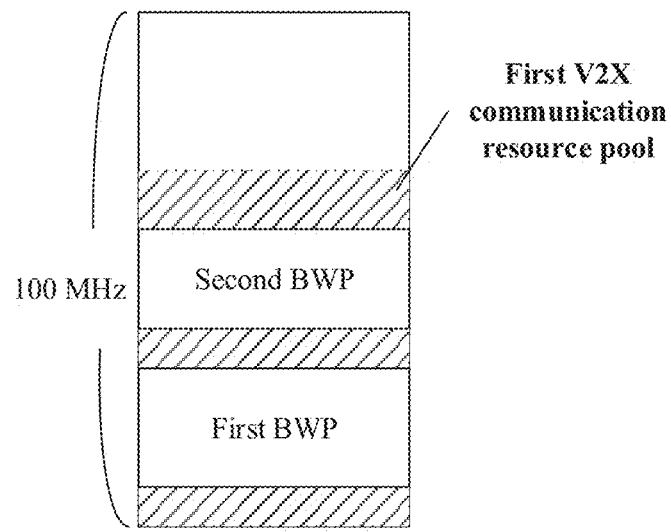
FIG. 6a is a schematic structural diagram showing another resource configuration according to an embodiment of the present application.

In another possible design, as shown in FIG. 6, based on the embodiment shown in FIG. 5, this embodiment may further include step 200: If the first communications device configures a first V2X communication resource pool, the first communications device may configure the first BWP and the second BWP for the second communications device within the first V2X communication resource. For a specific configuration situation, refer to FIG. 6a.

Further, the processing module 801 of the first communications device may configure the first V2X communication resource pool.

For example, in the foregoing embodiments, the first BWP and the second BWP that are configured by the first communications device for the second communications device may be adjacent or not adjacent.

Figure 7:
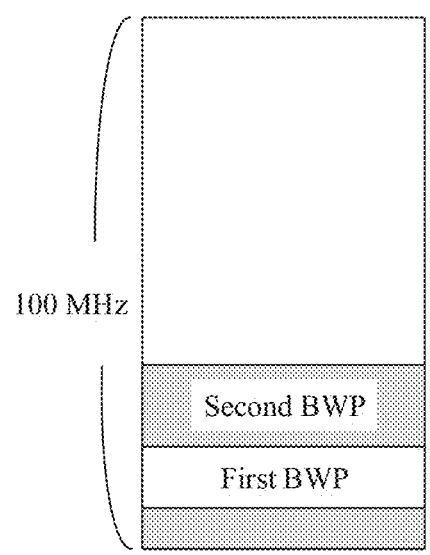
FIG. 7 is a schematic flowchart of another resource configuration method according to an embodiment of the present application.

In another possible design, in the embodiment shown in FIG. 2, before step 201, the first communications device may further first configure a second BWP, and step 201 may be specifically: The first communications device configures a first BWP for each second communications device in the second communications device group in the second BWP. As shown in FIG. 7, by using this solution, when the second communications device needs to transmit a service, the second communications device only needs to activate the second BWP, and does not need to deactivate all the first BWPs, thereby reducing a signaling procedure.

Specifically, the processing module 801 of the first communications device may first configure the second BWP, and configure the first BWP for each second communications device in the second communications device group in the second BWP.

Figure 7A:
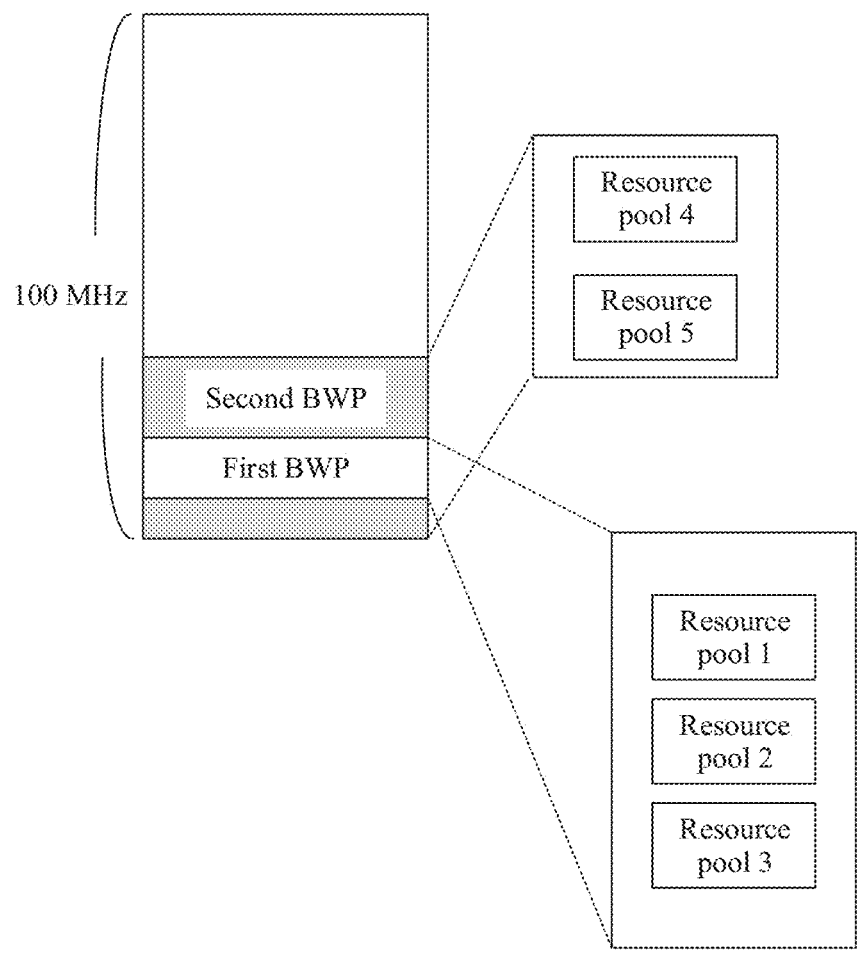
FIG. 7a is a schematic structural diagram showing another resource configuration according to an embodiment of the present application.

As shown in FIG. 7a, the method may further include: configuring, by the first communications device, one or more second V2X communication resource pools on the second BWP (a gray background color in the figure). The configuration information that is of the first BWP and that is sent by the first communications device to each second communications device in the second communications device group further includes information about one or more V2X communication resource pools configured on the first BWP and information about one or more V2X communication resource pools configured on the second BWP.

In the foregoing embodiments, the second BWP may be used to transmit a second service between some second communications devices in the second communications device group. For example, the second service may be information transmission of a non-basic security service, and the non-basic security service may be a self-driving service or service that does not need to be performed by all second communications devices in the second communications device group.

In addition, the first communications device may alternatively indicate, by using control signaling, the second communications device to activate one or more second BWPs that are configured by the first communications device and that are other than the first BWP, and send or receive, on a resource pool included in the second BWP, other V2X service information other than basic security information.

It should be specially noted that in this application, each second communications device in the second communications device group may transmit a common service between the second communications devices via the first BWP, and the common service may be a service that needs to be performed by each second communications device. A part or all of the second communications devices in the second communications device group may transmit a non-common service between the part or all of the second communications devices via the second BWP. The non-common service is a service that does not need to be performed by all the second communications devices in the second communications device group.

In different communications systems, one or more BWPs may be set for different bandwidths. The foregoing method provided in the embodiments of the present application may also be applied to a scenario in which a plurality of first BWPs and/or a plurality of second BWPs are set.

It should be specially noted that in this application, the first communications device may also directly send the configuration information of the first BWP to each second communications device in the second communications device group, and first BWPs indicated in the configuration information that is of the first BWP and that is received by each second communications device are the same. The first communications device sends the control signaling to all the second communications devices in the second communications device group, where the control signaling is used to indicate all the second communications devices in the second communications device group to activate the first BWP, that is, perform communication between the second communications devices via the first BWP. Optionally, the first communications device may also directly send the configuration information of the second BWP to some second communications devices in the second communications device group. To be specific, this example is similar to the foregoing embodiments. A difference only lies in that the first communications device does not need to first configure a first BWP resource or a second BWP resource for the second communications device in the second communications device group, but directly notifies the second communications device by using the configuration message of the first BWP or the configuration message of the second BWP.

Alternatively, the first communications device or the second communications device may be a chip or a system on chip, to complete the method shown in the embodiment of FIG. 2.

An embodiment of this application further provides a computer storage medium. The computer storage medium may be configured to store a computer software instruction used by the communications devices in the embodiment shown in FIG. 2, and the computer software instruction includes a program designed for the communications devices in the foregoing embodiments. The storage medium includes but is not limited to a flash memory, a hard disk, or a solid-state drive.

An embodiment of this application further provides a computer program product. When the computer product is run on a computing device, the computer product may perform a communication method designed for the communications devices in the embodiment in FIG. 2.

In the specification, claims, and accompanying drawings of this application, the terms "first", "second", and the like are intended to distinguish between different objects but not to describe a particular order. In addition, the terms "including", "having", or any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the procedures of the methods in the embodiments may be implemented by a computer program indicating relevant hardware. The program may be stored in a computer-readable storage medium. When the program runs, the procedures of the methods in the embodiments are performed. The foregoing storage medium may be: a magnetic disk, an optical disc, a read-only memory (ROM), or a random access memory (RAM).

What are disclosed above are merely examples of embodiments of this application, and certainly is not intended to limit the protection scope of this application. Therefore, equivalent variations made according to the claims of this application shall fall within the scope of this application.

The invention claimed is:

1. A method, comprising:
   determining, by a first communications device, a first bandwidth part (BWP) in a carrier and one or more vehicle-to-everything (V2X) communication resource pools for a plurality of second communications devices, wherein the one or more V2X communication resource pools are within the first BWP, and wherein the one or more V2X communication resource pools comprise V2X communication resources; and
   sending, by the first communications device, configuration information of the first BWP to at least one second communications device in the plurality of second communications devices, wherein the configuration information of the first BWP comprises information about the one or more V2X communication resource pools within the first BWP.

2. The method according to claim 1, further comprising:
   sending, by the first communications device, signaling to the at least one second communications device in the plurality of second communications devices, wherein the signaling indicates to deactivate or activate the first BWP.

3. The method according to claim 1, wherein the configuration information of the first BWP is used to configure the first BWP.

4. The method according to claim 2, wherein the signaling comprises BWP indication information.

5. The method according to claim 1, wherein the method further comprises:
   communicating, by the first communications device with one or more second communications devices, on a V2X communication resource determined from the one or more V2X communication resource pools.

6. The method according to claim 1, wherein the method further comprises:
communicating, by the at least one second communications device with the first communications device, on a V2X communication resource determined from the one or more V2X communication resource pools.

7. A method, comprising:
receiving, by a second communications device, configuration information of a first bandwidth part (BWP), wherein the configuration information of the first BWP comprises information about one or more vehicle-to-everything (V2X) communication resource pools, wherein the one or more V2X communication resource pools are within the first BWP in a carrier, and wherein the one or more V2X communication resource pools comprise V2X communication resources.

8. The method according to claim 7, further comprising:
receiving, by the second communications device, signaling; and
determining the first BWP is deactivated or activated based on the signaling.

9. The method according to claim 7, wherein the configuration information of the first BWP is used to configure the first BWP.

10. The method according to claim 8, wherein the signaling comprises BWP indication information.

11. An apparatus, comprising:
a transmitter; and
one or more processors configured to:
determine a first bandwidth part (BWP) in a carrier and one or more vehicle-to-everything (V2X) communication resource pools for a plurality of second communications devices, wherein the one or more V2X communication resource pools are within the first BWP, and wherein the one or more V2X communication resource pools comprise V2X communication resources; and
send configuration information of the first BWP to at least one second communications device in the plurality of second communications devices, wherein the configuration information of the first BWP comprises information about the one or more V2X communication resource pools within the first BWP.

12. The apparatus according to claim 11, wherein the one or more processors are further configured to:
send signaling to the at least one second communications device in the plurality of second communications devices, wherein the signaling indicates to deactivate or activate the first BWP.

13. The apparatus according to claim 11, wherein the configuration information of the first BWP is used to configure the first BWP.

14. The apparatus according to claim 12, wherein the signaling comprises BWP indication information.

15. The apparatus according to claim 11, wherein the one or more processors are further configured to:
communicate with one or more second communications devices on a V2X communication resource determined from the one or more V2X communication resource pools.

16. An apparatus, comprising:
a receiver; and
one or more processors configured to:
receive configuration information of a first bandwidth part (BWP), wherein the configuration information of the first BWP comprises information about one or more vehicle-to-everything (V2X) communication resource pools, wherein the one or more V2X communication resource pools are within the first BWP in a carrier, and wherein the one or more V2X communication resource pools comprise V2X communication resources.

17. The apparatus according to claim 16, wherein the one or more processors are further configured to:
receive signaling; and
determine that the first BWP is deactivated or activated based on the signaling.

18. The apparatus according to claim 16, wherein the one or more processors are further configured to:
configure the first BWP using the configuration information of the first BWP.

19. The apparatus according to claim 17, wherein the signaling comprises BWP indication information.

20. The apparatus according to claim 16, wherein the one or more processors are further configured to:
communicate with a first communications device, on a V2X communication resource determined from the one or more V2X communication resource pools.

21. A non-transitory computer-readable storage medium, comprising executable instructions, wherein the executable instructions, when executed by at least one processor of an apparatus, cause the apparatus to:
determine a first bandwidth part (BWP) in a carrier and one or more vehicle-to-everything (V2X) communication resource pools for a plurality of second communications devices, wherein the one or more V2X communication resource pools are within the first BWP, and wherein the one or more V2X communication resource pools comprise V2X communication resources; and
send configuration information of the first BWP to at least one second communications device in the plurality of second communications devices, wherein the configuration information of the first BWP comprises information about the one or more V2X communication resource pools within the first BWP.

22. A non-transitory computer-readable storage medium, comprising executable instructions, wherein the executable instructions, when executed by a processor of an apparatus, cause the apparatus to:
receive configuration information of a first bandwidth part (BWP), wherein the configuration information of the first BWP comprises information about one or more vehicle-to-everything (V2X) communication resource pools, wherein the one or more V2X communication resource pools are within the first BWP in a carrier, and wherein the one or more V2X communication resource pools comprise V2X communication resources.

* * * * *